Patented June 5, 1923.

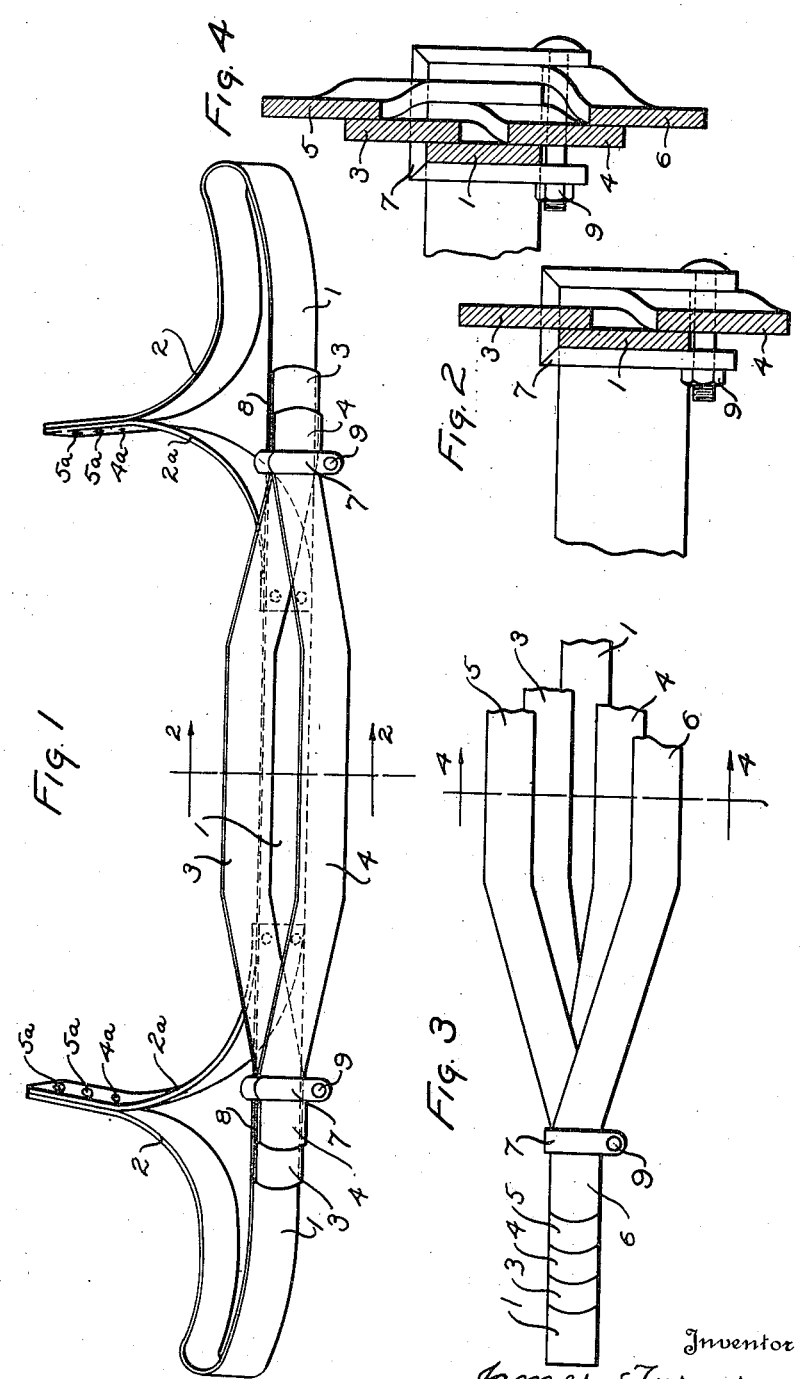

1,457,502

UNITED STATES PATENT OFFICE.

PEARL P. CRABILL AND JAMES TURNER, OF SPRINGFIELD, OHIO, ASSIGNORS TO THE CENTRAL BRASS AND FIXTURE COMPANY, OF SPRINGFIELD, OHIO, A CORPORATION OF OHIO.

AUTOMOBILE BUMPER.

Application filed October 29, 1921. Serial No. 511,413.

*To all whom it may concern:*

Be it known that we, PEARL P. CRABILL and JAMES TURNER, citizens of the United States, residing at Springfield, in the county of Clark and State of Ohio, have invented certain new and useful Improvements in Automobile Bumpers, of which the following is a specification, reference being had therein to the accompanying drawing.

This invention relates to automobile bumpers, and has for its object to constitute a bumper of a plurality of flexible bars or strips of resilient material, such as steel, arranged with each bar or strip overlapping the adjacent bar or strip, whereby blows received by either bar or strip are resisted in part by the bar or strip which is struck and the bar or strip which it overlaps, so that the individual flexibility of each bar is obtained while the combined strength of a plurality of bars is afforded.

And a further object is to so arrange the several bars or strips that strains due to blows are transferred from strip to strip, according to which particular bar or strip is struck or itself strikes an opposing object.

And a still further object of our invention is the provision of a curved flexible or resilient brace connected with the bumper bar proper, for the purpose of affording additional powers of resistance to the bumper and also to reduce vibration of the latter.

In the accompanying drawings:

Fig. 1 is a perspective view of our improved bumper in its preferred form;

Fig. 2 is a vertical sectional view of the same on the line 2—2 of Fig. 1;

Fig. 3 is a front elevation of our bumper in a modified form; and

Fig. 4 is a sectional view of the same on the line 4—4 of Fig. 3.

In the drawings, the numeral 1 designates a continuous bar or strip of metal, preferably spring steel, which forms the base member of our bumper. This base member terminates in portions 2 adapted for attachment to the frame of an automobile, and these members being flexible will permit of their being sprung inward or outward to accommodate themselves to varying widths of frames within a reasonable degree. The base member extends from one portion 2 to the other and is continuous or preferably so.

Mounted on and firmly secured to the base member 1 is a plurality of supplemental strips or bars, two of them in the preferred form shown in Figs. 1 and 2 and four of them in the modified form shown in Figs. 3 and 4. These supplemental strips or bars are designated, respectively, 3, 4, 5 and 6. The strips 3 and 4 overlap the base member 1 and in the case of the modification the strips 5 and 6 overlap strips 3 and 4, respectively. The extent of the overlap may vary, and will be in proportion to the width of each strip. Preferably the overlap is of a width about one-fourth of the width of a strip. The strips are all thin and relatively wide.

In some cases it may be desirable to make the base strip of slightly larger transverse dimensions than the other strips, as for instance, the base strip may be somewhat thicker than the others, as indicated in Fig. 4, where the base strip is shown somewhat thicker than any of the other strips with a view of giving it substantially the same capacity for resisting blows or impacts as is provided for in the other strips by their own inherent capacity for resistance plus the reinforcing aid they obtain by being overlapped with an adjacent strip.

The general effect is to afford an automobile bumper of great flexibility and yieldability, yet with the full needed capacity of resistance to blows and impacts. And an incidental effect is that of extending the vertical area of the general impact surface, so that obstructing objects or delivered blows of different distances from the ground will be met, this being an incident to the use of a multiplicity of bars or strips in their overlapped relation one to the other.

A blow sustained by the base member 1 will be resisted according to its capacity; a blow sustained by the strips 3 or 4 will be sustained by the capacity of such strip plus the reinforcing aid it obtains by overlapping the base strip; and the blow sustained by strip 5 or 6 will likewise be sustained by the capacity of such strip plus the reinforcing aid it obtains by its overlapped contact with the adjacent strip.

A convenient and preferable means of securing together the several bars or strips consists of a clamp designated 7 adapted to embrace all the strips when they overlap each other at the point 8 and having at its open end a bolt and nut 9 by which the clamp is bound tightly against all of the strips within it. This is one effective means for securing the several strips together and to the base strip.

Referring to the third object of our invention, as stated in the preamble, the numeral 2$^a$ designates a curved flexible or resilient brace composed of a plate of, say, steel, of wide vertical dimension as compared with its thickness. This brace member is secured at one end to the bumper bar proper designated 1, preferably by means of rivets 3$^a$ and at the other by a rivet 4$^a$ to the end portion 2. Preferably also this brace member 2$^a$ extends to the location of the devices by which the bumper is secured to the automobile frame. To this end the brace member has holes 5$^a$ for the bolts which are used to attach the bumper to the machine, the holes 5$^a$ extending also, in the form shown, through the end portions 2 of the bumper.

This base member affords increased resistance to the bumper, yet in a highly flexible manner, while it also braces the bumper vertically and prevents or reduces to a minimum any vertical vibration. In practice this feature has proved to be very effective and beneficial.

Having thus fully described our invention, what we claim as new and desire to secure by Letters Patent, is:—

1. An automobile bumper comprising a base strip of resilient material, thin and relatively wide and having end portions adapted to be attached to an automobile frame, a plurality of strips of similar material and relative dimensions overlapping the base strip and extending vertically above and below it, and having their ends overlapped on each other and on the base strip, and means to secure such overlapped ends to the base strip.

2. An automobile bumper comprising a base strip thin and relatively wide and having end portions adapted to be connected to an automobile frame, a plurality of strips of similar material and having similar relative dimensions, each overlapping the base strip and leaving a space between them throughout their major portion, with their ends overlapped on each other and on the base strip, and means to secure such ends to the base strip.

3. An automobile bumper comprising a base strip of resilient material, thin and relatively wide, a plurality of other strips overlapping the base strip and each other and of similar material and relative dimensions, and means to secure all of said strips to the base strip.

4. An automobile bumper comprising a base strip adapted to extend across an automobile frame and to have its ends secured thereto, of resilient material relatively thin and wide, and a plurality of supplemental strips, two of which overlap each other, such overlapping embracing the major portions of the base and supplemental strips, and the ends of all the strips brought together and overlapped and lying on the base strip, and means to secure such ends to the base strip.

In testimony whereof, we affix our signatures.

PEARL P. CRABILL.
JAMES TURNER.